United States Patent
Lee et al.

(10) Patent No.: US 9,047,673 B2
(45) Date of Patent: Jun. 2, 2015

(54) APPARATUS AND METHOD FOR EXTRACTING TARGET, AND RECORDING MEDIUM STORING PROGRAM FOR PERFORMING THE METHOD

(71) Applicant: SAMSUNG TECHWIN CO., LTD., Changwon (KR)

(72) Inventors: Hwal-suk Lee, Changwon (KR); Sang-ji Park, Changwon (KR)

(73) Assignee: SAMSUNG TECHWIN CO., LTD., Changwon (KR)

( * ) Notice: Subject to any disclaimer, the term of this patent is extended or adjusted under 35 U.S.C. 154(b) by 164 days.

(21) Appl. No.: 13/795,446

(22) Filed: Mar. 12, 2013

(65) Prior Publication Data

US 2013/0322754 A1 Dec. 5, 2013

(30) Foreign Application Priority Data

May 30, 2012 (KR) ........................ 10-2012-0057471

(51) Int. Cl.
*G06K 9/00* (2006.01)
*G06T 7/00* (2006.01)

(52) U.S. Cl.
CPC .............. *G06T 7/0081* (2013.01); *G06T 7/0087* (2013.01); *G06T 2207/20016* (2013.01); *G06T 2207/20076* (2013.01); *G06T 2207/30196* (2013.01); *G06T 2207/30212* (2013.01); *G06T 2207/30232* (2013.01)

(58) Field of Classification Search
USPC ........... 382/103, 190, 195, 171; 348/142, 152
See application file for complete search history.

(56) References Cited

U.S. PATENT DOCUMENTS

| | | | | |
|---|---|---|---|---|
| 6,141,435 A | * | 10/2000 | Naoi et al. | 382/104 |
| 2006/0023916 A1 | * | 2/2006 | Yang et al. | 382/103 |
| 2007/0250898 A1 | * | 10/2007 | Scanlon et al. | 725/135 |

FOREIGN PATENT DOCUMENTS

| KR | 2003-0012193 A | 2/2003 |
|---|---|---|
| KR | 10-1040306 B1 | 6/2011 |

OTHER PUBLICATIONS

Lee, Hwal-Suk, et al., "Development of a Demeaning Filter for Small Object Detection in Infrared Images," Automatic Target Recognition XIX, Proc. of SPIE, vol. 7335, 733513, 2009, pp. 1-12.

* cited by examiner

*Primary Examiner* — Chan Park
*Assistant Examiner* — Eueng-Nan Yeh
(74) *Attorney, Agent, or Firm* — Sughrue Mion, PLLC

(57) ABSTRACT

A target extracting apparatus and method for extracting a target through probability modeling of pixel brightness values in an image, and a recording medium storing a program for performing the method, are disclosed. The method includes extracting a background image from an input image, modeling brightness values of the input image and the background image based on a Gaussian distribution to generate an input image modeling result and a background image modeling result, calculating likelihood ratios for determining whether a pixel in the input image corresponds to a target based on a correlation between the input image modeling result and the background image modeling result and target templates having different sizes; determining a location of the target based on the calculated likelihood ratios; and outputting the determined location of the target.

18 Claims, 14 Drawing Sheets

FIG. 10A
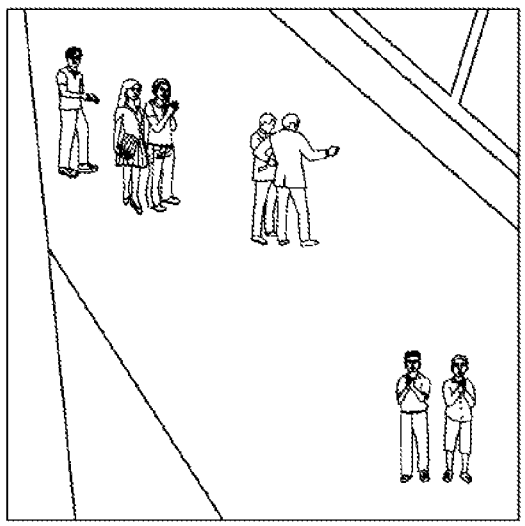
FIG. 10B
FIG. 10C
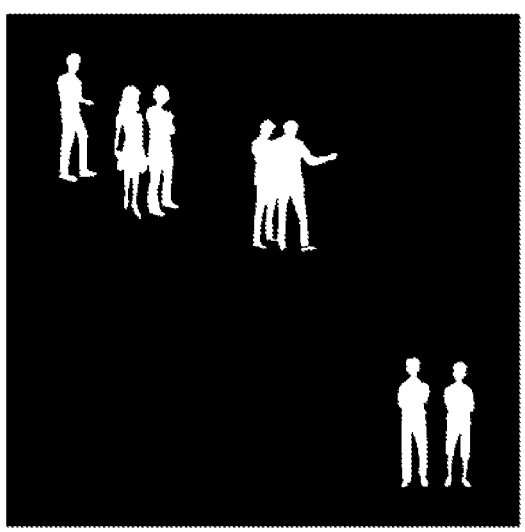

APPARATUS AND METHOD FOR EXTRACTING TARGET, AND RECORDING MEDIUM STORING PROGRAM FOR PERFORMING THE METHOD

CROSS-REFERENCE TO RELATED PATENT APPLICATION

This application claims the benefit of Korean Patent Application No. 10-2012-0057471, filed on May 30, 2012, in the Korean Intellectual Property Office, the disclosure of which is incorporated herein in its entirety by reference.

BACKGROUND

1. Field

The present disclosure relates to an apparatus and method for extracting a target, and a recording medium storing a program for performing the method, and more particularly, to a target extracting apparatus and method for extracting a target through probability modeling of pixel brightness values in an image, and a recording medium storing a program for performing the method.

2. Description of the Related Art

In general, a method of extracting a target through background image modeling may be represented by Equation 1.

$$|I_{input}(x) - I_{background}(x)| > T \quad (1)$$

where x denotes a location of a specific pixel, and I(x) denotes a brightness value of a pixel x.

Equation 1 simply uses a difference between brightness values of an input image and a background image when a target is extracted, and the target can be extracted only if the number of background image prediction models is 1.

SUMMARY

The present disclosure provides a target extracting apparatus and method for correctly extracting a target from an image regardless of a change in target size by using background image modeling and a plurality of target templates having different sizes, and a recording medium storing a program for performing the method.

According to an aspect of an exemplary embodiment, there is provided a method of extracting a target, the method including: extracting a background image from an input image; modeling brightness values of the input image and the background image based on a Gaussian distribution to generate an input image modeling result and a background image modeling result; calculating likelihood ratios for determining whether a pixel in the input image corresponds to a target based on a correlation between the input image modeling result and the background image modeling result and target templates having different sizes; determining a location of the target based on the calculated likelihood ratios; and outputting the determined location of the target.

The modeling of the brightness values may include: setting a window having a predetermined size about a pixel in each of the input image and the background image; calculating a mean brightness value of pixels included in the set window; subtracting the mean brightness value from a brightness value of a center pixel in the set window; and generating an image in which the mean brightness value is subtracted from the brightness value of the center pixel in the set window while scanning the input image and the background image with the set window.

The calculating of the likelihood ratios may include: receiving Gaussian distribution modeling results of the input image and the background image; receiving the target templates having different sizes; calculating a correlation between the input image modeling result and the background image modeling result; and acquiring likelihood ratios for each of a plurality of pixels in the input image, a number of the acquired likelihood ratios corresponding to a number of the target templates, and determining a maximum likelihood ratio from among the acquired likelihood ratios as a likelihood ratio of the pixel corresponding to the target.

In the receiving of the target templates having different sizes, if the target templates having different sizes are set in advance, the target templates may use brightness distribution values of the set target templates.

In the receiving of the target templates having different sizes, if the target templates having different sizes are not set in advance, the target templates may be set to have a first value.

The calculating of the correlation may include: extracting a first sub-image having a corresponding target template size from the Gaussian distribution modeling result of the input image; extracting a second sub-image having the corresponding target template size from the Gaussian distribution modeling result of the background image; and calculating a correlation indicating a similarity between the input image and the background image by using the first sub-image and the second sub-image.

The correlation may be calculated by using the equation:

$$\rho_k = \frac{\sum_{i,j} Y'_k(i,j) \cdot X'_k(i,j)}{\sum_{i,j} \{X'_k(i,j)\}^2},$$

where $Y'_k = Y_k - \overline{Y}$, $X'_k = X_k - \overline{X}$, $Y_k - \overline{Y}$ denotes a first sub-image having a kth target template size, which is extracted from the Gaussian distribution modeling result of the input image, where i and j are location coordinates of a pixel in the Gaussian distribution modeling result of the input image, $Y_k$ is an input image and $\overline{Y}$ is an average of the input images, and $X_k - \overline{X}$ denotes a second sub-image having the kth target template size, which is extracted from the Gaussian distribution modeling result of the background image, where $X_k$ is a background image and $\overline{X}$ is an average of the background images.

Each of the likelihood ratios may be calculated by using the equation:

$$\Lambda_0(p) = \max_k (S^k)^T [Y'_k - \rho_k \cdot X'_k] / |S^k|, \text{ where } k \in \{1, \ldots, L\},$$

where $S^k$ denotes a kth target template from among the target templates having different sizes, $Y'_k = Y_k - \overline{Y}$, $X'_k = X_k - \overline{X}$, $Y_k - \overline{Y}$ denotes a first sub-image having a kth target template size based on the Gaussian distribution modeling result of the input image, $X_k - \overline{X}$ denotes a second sub-image having the kth target template size based on the Gaussian distribution modeling result of the background image, p denotes the location of a pixel, T denotes a real number, L denotes a number of the target templates, and $\rho_k$ denotes a correlation calculated from the first sub-image and the second sub-image.

For a single target, the determining of the location of the target may include determining a location of a pixel having a maximum likelihood ratio from among the calculated likelihood ratios as the location of the target.

For a plurality of targets, the determining of the locations of the targets may include: receiving the calculated likelihood ratios and a threshold for target determination; generating a target map having a same size as the input image, setting areas on the target map to have a first value when each of the likelihood ratios for the areas is greater than the threshold, and setting areas on the target map to have a second value when each of the likelihood ratios for the areas is not greater than the threshold; and determining each area set to the first value as a single target, setting a representative location for each of the plurality of targets, and determining the representative locations as locations of the plurality of targets.

According to another aspect of an exemplary embodiment, there is provided an apparatus which extracts a target, the apparatus including: a background image extractor which extracts a background image from an input image; a Gaussian distribution modeling unit which models brightness values of the input image and the background image based on a Gaussian distribution to generate an input image modeling result and a background image modeling result; a likelihood ratio calculator which calculates likelihood ratios used to determine whether a pixel in the input image corresponds to a target based on a correlation between the input image modeling result and the background image modeling result and target templates having different sizes; and a target location determiner which determines a location of the target based on the calculated likelihood ratios and outputs the determined location of the target.

The Gaussian distribution modeling unit may include: a window setup unit which sets a window having a predetermined size about a pixel in each of the input image and the background image; a first calculator which calculates a mean brightness value of pixels included in the set window; a second calculator which subtracts the mean brightness value from a brightness value of the a center pixel in the window; and a Gaussian distribution image generator which generates an image in which the mean brightness value is subtracted from the brightness value of the center pixel in the set window while scanning the input image and the background image with the set window.

The likelihood ratio calculator may include: a receiver which receives Gaussian distribution modeling results of the input image and the background image and receives the target templates having different sizes; a correlation calculator which calculates a correlation between the input image modeling result and the background image modeling result; and a likelihood ratio determiner which acquires likelihood ratios for each of a plurality of pixels in the input image, a number of the acquired likelihood ratios corresponding to a number of the target templates and determines a maximum likelihood ratio from among the acquired likelihood ratios as a likelihood ratio of the pixel corresponding to the target.

In the receiver, if the target templates having different sizes are set in advance, the target templates may use brightness distribution values of the set target templates.

In the receiver, if the target templates having different sizes are not set in advance, the target templates may be set to have a first value.

The correlation calculator may calculate the correlation by using the equation:

$$\rho_k = \frac{\sum_{i,j} Y'_k(i,j) - X'_k(i,j)}{\sum_{i,j} \{X'_k(i,j)\}^2},$$

where $Y'_k = Y_k - \overline{Y}$, $X'_k = X_k - \overline{X}$, $Y_k - \overline{Y}$ denotes a first sub-image having a kth target template size, which is extracted from the Gaussian distribution modeling result of the input image, and $x_k - \overline{x}$ denotes a second sub-image having the kth target template size, which is extracted from the Gaussian distribution modeling result of the background image.

The likelihood ratio determiner may calculate the likelihood ratios by using the equation:

$$\Lambda_0(p) = \max_k (S^k)^T [Y'_k - \rho_k \cdot X'_k] / |S^k|, \text{ where } k \in \{1, \ldots, L\},$$

where $S^k$ denotes a kth target template from among the target templates having different sizes, $Y'_k = Y_k - \overline{Y}$, $X'_k = X_k - \overline{X}$, $Y_k - \overline{Y}$ denotes a first sub-image having a kth target template size based on the Gaussian distribution modeling result of the input image, $x_k - \overline{X}$ denotes a second sub-image having the kth target template size based on the Gaussian distribution modeling result of the background image, and $\rho_k$ denotes a correlation calculated from the first sub-image and the second sub-image.

For a single target, the target location determiner may determine a location of a pixel having a maximum likelihood ratio from among the calculated likelihood ratios as a location of the target.

For a plurality of targets, the target location determiner may receive the likelihood ratios and a threshold for target determination, generate a target map having a same size as the input image, set areas on the target map to have a first value when each of the likelihood ratios for the areas is greater than the threshold, set areas on the target map to have a second value when each of the likelihood ratios for the areas is not greater than the threshold, determine each area set to the first value as a single target, set a representative location for each of the plurality of targets, and determine the representative locations as locations of the plurality of targets.

According to another aspect of an exemplary embodiment, there is provided a non-transitory computer-readable recording medium storing a computer-readable program for executing a method of extracting a target, the method including: extracting a background image from an input image; modeling brightness values of the input image and the background image based on a Gaussian distribution to generate an input image modeling result and a background image modeling result; calculating likelihood ratios for determining whether a pixel in the input image corresponds to a target based on a correlation between the input image modeling result and the background image modeling result and target templates having different sizes; determining a location of the target based on the calculated likelihood ratios; and outputting the determined location of the target.

BRIEF DESCRIPTION OF THE DRAWINGS

The above and other features and advantages of the present disclosure will become more apparent by describing in detail exemplary embodiments thereof with reference to the attached drawings in which:

FIGS. 10A to 10C illustrate an operation of labeling a plurality of targets;

DETAILED DESCRIPTION

Figure 1:
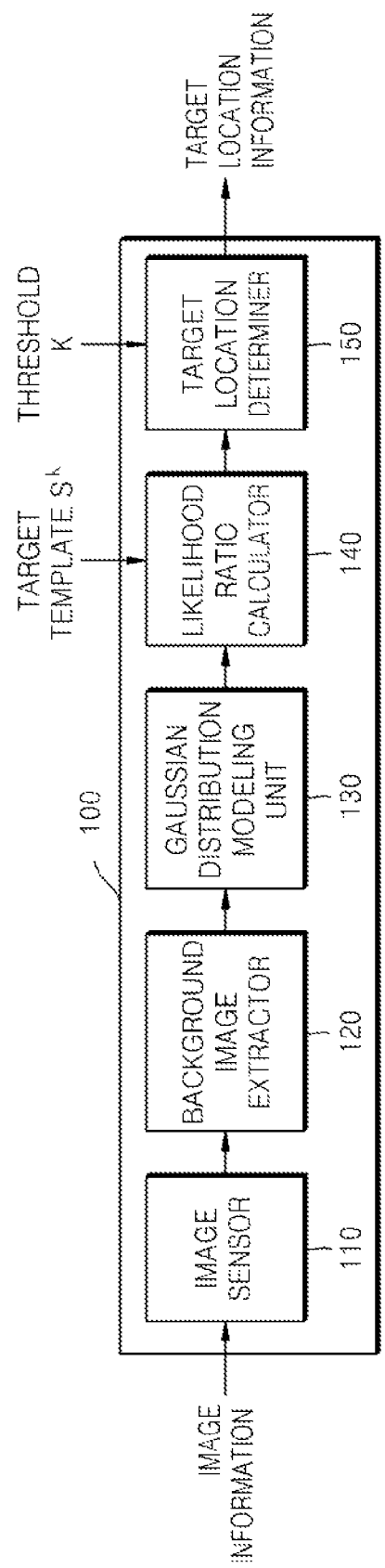
FIG. 1 is a block diagram of a target extracting apparatus according to an exemplary embodiment.

The present disclosure may allow various kinds of changes or modifications and various changes in form, and specific exemplary embodiments will be illustrated in the drawings and described in detail in the specification. However, it should be understood that the specific exemplary embodiments do not limit the disclosure invention to a specific form, but include every modified, equivalent, or replaced exemplary embodiment within the spirit and technical scope of the present disclosure. In the following description, well-known functions or constructions are not described in detail since they would obscure the exemplary embodiments with unnecessary detail.

Although terms such as 'first' and 'second' can be used to describe various elements, these terms do not limit the various elements. The terms can be used to distinguish a certain element from another element.

The terminology used in the application is used only to describe specific exemplary embodiments and is not intended to limit the present disclosure. An expression in the singular includes an expression in the plural unless they are disclosed as being clearly different from each other. In the application, it should be understood that terms, such as 'include' and 'have', are used to indicate the existence of an implemented feature, number, step, operation, element, part, or a combination thereof without excluding in advance the possibility of the existence or addition of one or more other features, numbers, steps, operations, elements, parts, or combinations thereof.

The present disclosure can be represented with functional blocks and various processing steps. These functional blocks can be implemented by various numbers of hardware and/or software configurations for executing specific functions. For example, the present disclosure may adopt direct circuit configurations, such as memory, processing, logic, and look-up tables, for executing various functions under a control of one or more processors or by other control devices. Like the components of the present disclosure can execute the various functions with software programming or software elements, the present disclosure can be implemented by a programming or scripting language, such as C, C++, Java, or assembly language, with various algorithms implemented by a combination of a data structure, processes, routines, and/or other programming components. Functional aspects can be implemented with algorithms executed in one or more processors. In addition, the present disclosure may adopt the prior art for an electronic environment setup, signal processing and/or data processing. Various terms used herein, such as "mechanism", "element", "means", and "configuration", can be widely used and are not delimited as mechanical and physical configurations. The terms may include the meaning of a series of routines of software in association with a processor.

Hereinafter, the present disclosure will be described more fully with reference to the accompanying drawings, in which exemplary embodiments are shown. Like reference numerals in the drawings denote like elements, and thus their repetitive description will be omitted.

FIG. 1 is a block diagram of a target extracting apparatus 100 according to an exemplary embodiment.

Referring to FIG. 1, the target extracting apparatus 100 includes an image sensor 110, a background image extractor 120, a Gaussian distribution modeling unit 130, a likelihood ratio calculator 140, and a target location determiner 150.

The image sensor 110 detects an image signal input through a camera (not shown).

The image sensor 110 may be an infrared sensor for detecting an image by infrared rays, a thermal imaging sensor for detecting an image based on heat emitted from a subject, or a Charge-Coupled Device (CCD) sensor or a Complementary Metal-Oxide Semiconductor (CMOS) sensor for detecting an image based on colors of a subject. However, the image sensor 110 is not limited thereto, and any sensor capable of detecting an image may be used as the image sensor 110.

Figure 2A:
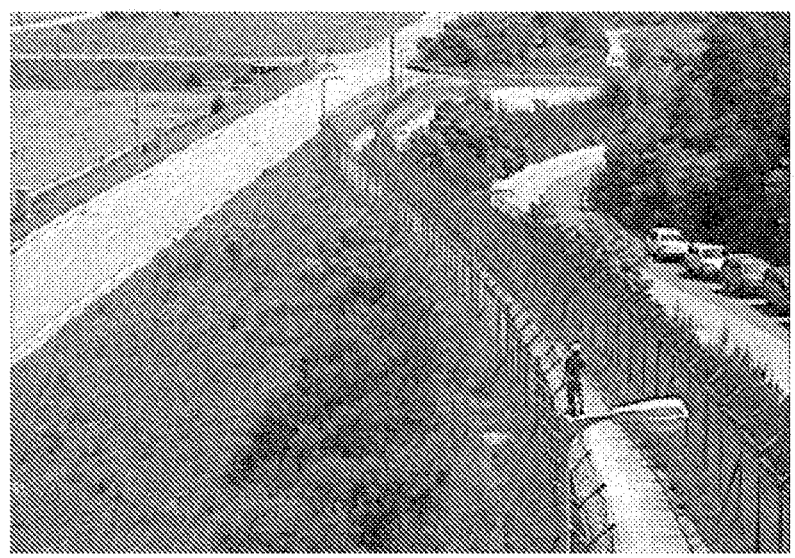
FIGS. 2A and 2B illustrate an input image and a histogram of the input image, respectively.
Figure 2B:
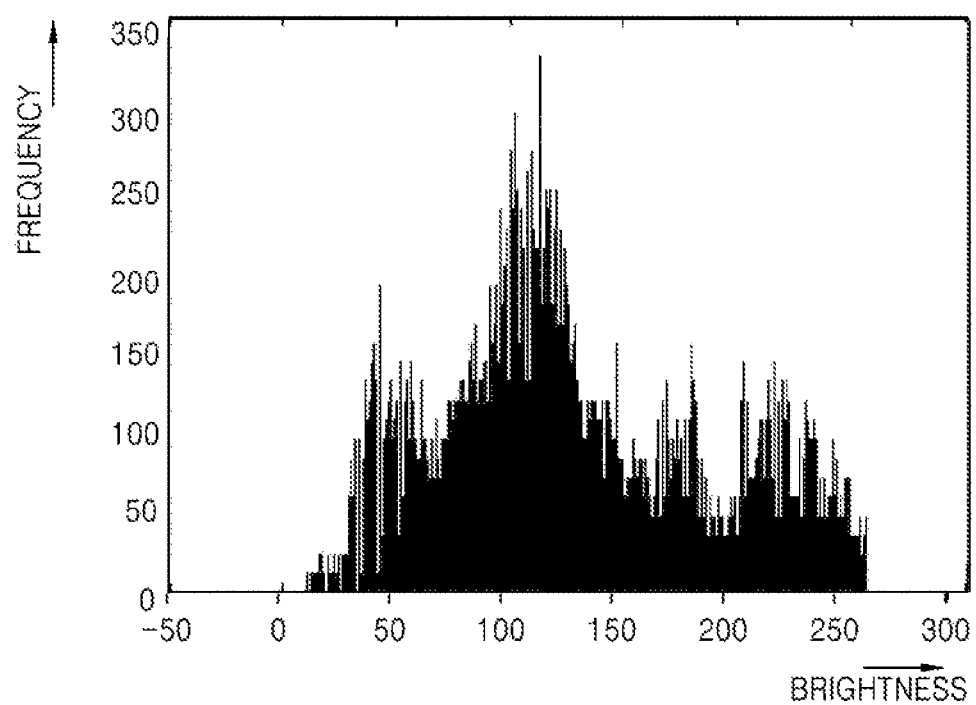

FIG. 2A shows an arbitrary input image, and FIG. 2B is a histogram showing a brightness distribution of the input image shown in FIG. 2A. FIG. 2B shows that the input image has a distribution of various brightness values.

The background image extractor 120 extracts a background image from the input image received from the image sensor 110.

According to exemplary embodiments, various methods of extracting a background image from an input image may be used. For example, a frame difference method may be used which includes comparing two consecutive image frames with each other and extracting a background image from a difference between the two image frames. Alternatively, another method may be used which includes extracting a background image d by modeling a color distribution of pixels with a single Gaussian function or several Gaussian functions. One of the various methods, a method of extracting a background image using a Gaussian mixture model, uses a stochastic learning method, by which the background image may be extracted by approximating a brightness distribution of pixels in an image using the Gaussian mixture model and determining to which one of a foreground area and a background area a measured pixel belongs using an approximated model variable value. In addition, another method may be used which includes extracting a background image by expressing a color distribution with only a probability distribution instead of modeling the color distribution by a specific function. Although colors are generally used to extract a background image from an input image, edges or texture may also be used instead of the colors. Methods using texture include a method using a 'local binary pattern' and a method using a 'mixture of dynamic texture'.

Figure 3A:
FIGS. 3A and 3B illustrate a background image and a histogram of the background image, respectively.
Figure 3B:
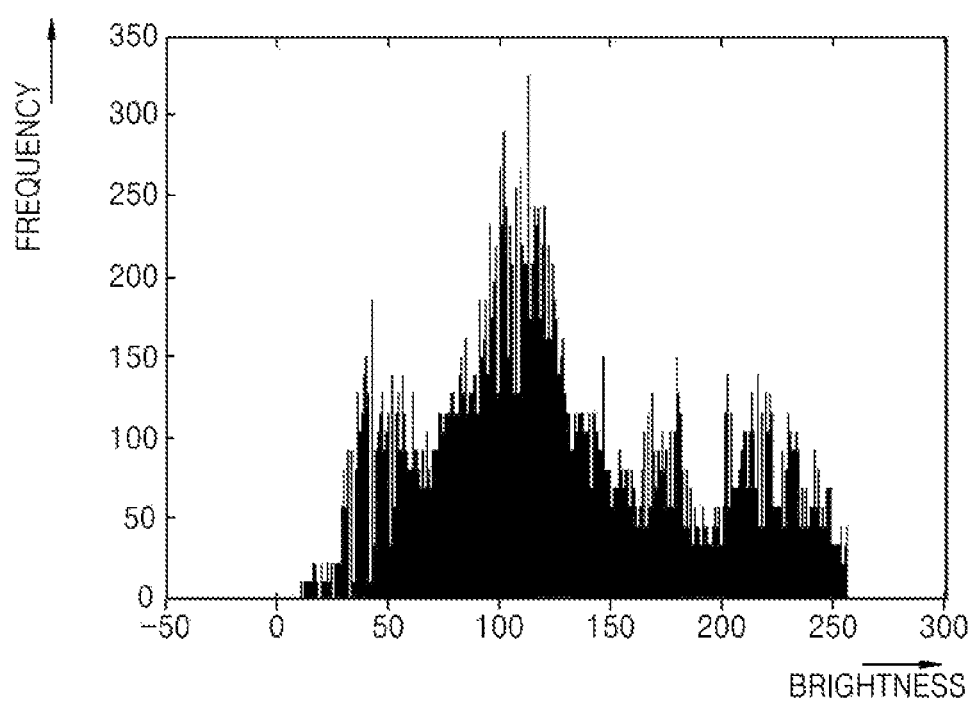

FIG. 3A shows a background image extracted from the input image shown in FIG. 2A, and FIG. 3B is a histogram showing a brightness distribution of the background image shown in FIG. 3A. In other words, FIG. 3B shows that the background image also has a distribution of various brightness values.

Figure 4:
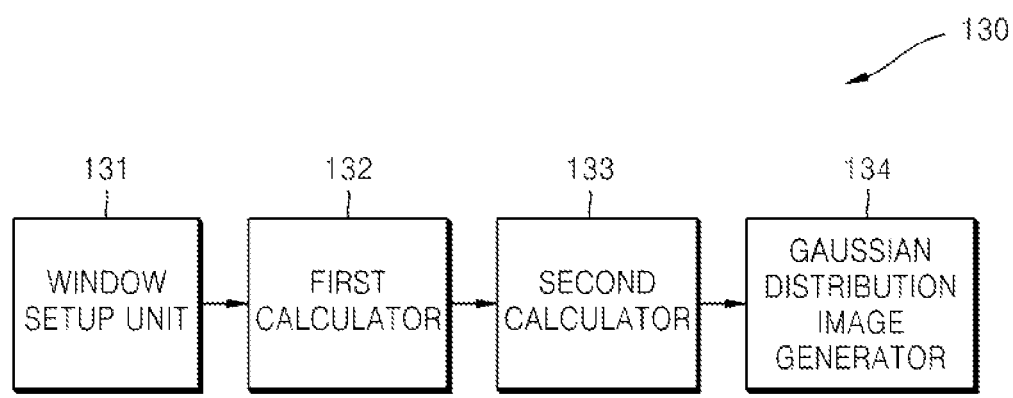
FIG. 4 is a block diagram of a Gaussian distribution modeling unit in the target extracting apparatus of FIG. 1.

The Gaussian distribution modeling unit 130 models brightness values of the input image and the background image based on a Gaussian distribution. Referring to FIG. 4, the Gaussian distribution modeling unit 130 includes a window setup unit 131, a first calculator 132, a second calculator 133, and a Gaussian distribution image generator 134.

The window setup unit 131 sets a window having a predetermined size, e.g., a 5×5 window, about an arbitrary pixel for each of the input image and the background image.

The first calculator 132 calculates a mean brightness value of pixels included in the window set for each of the input image and the background image. For example, the 5×5 window includes 25 pixels, and the first calculator 132 calculates a mean brightness value of the 25 pixels included in the 5×5 window.

The second calculator 133 subtracts the calculated mean brightness value from a brightness value of the window center pixel set in each of the input image and the background image.

Figure 5A:
FIGS. 5A and 5B illustrate a Gaussian distribution modeling result image of an input image and a histogram of the Gaussian distribution modeling result image, respectively.
Figure 5B:
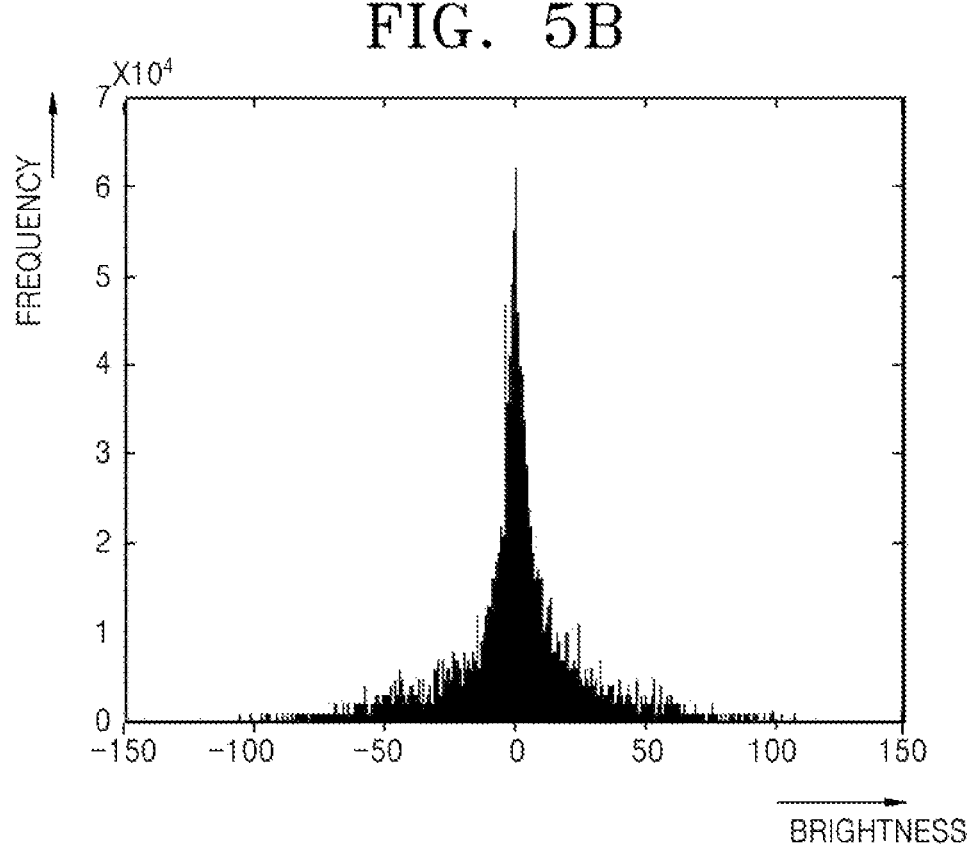

The Gaussian distribution image generator 134 generates a Gaussian distribution modeling image as Gaussian distribution modeling results obtained by subtracting every mean brightness value from a brightness value of each corresponding window center pixel while scanning the input image and the background image with a window about each pixel. A Gaussian distribution modeling image of the input image, which is generated by this process, is shown in FIG. 5A, and a histogram of the Gaussian distribution modeling image is shown in FIG. 5B. FIGS. 5A and 5B show that a brightness distribution of the input image follows a zero-mean Gaussian distribution. A Gaussian distribution modeling image of the background image, which is generated by this process, is shown in FIG. 6A, and a histogram of the Gaussian distribution modeling image is shown in FIG. 6B.

Figure 6A:
FIGS. 6A and 6B illustrate a Gaussian distribution modeling result image of a background image and a histogram of the Gaussian distribution modeling result image, respectively.
Figure 6B:
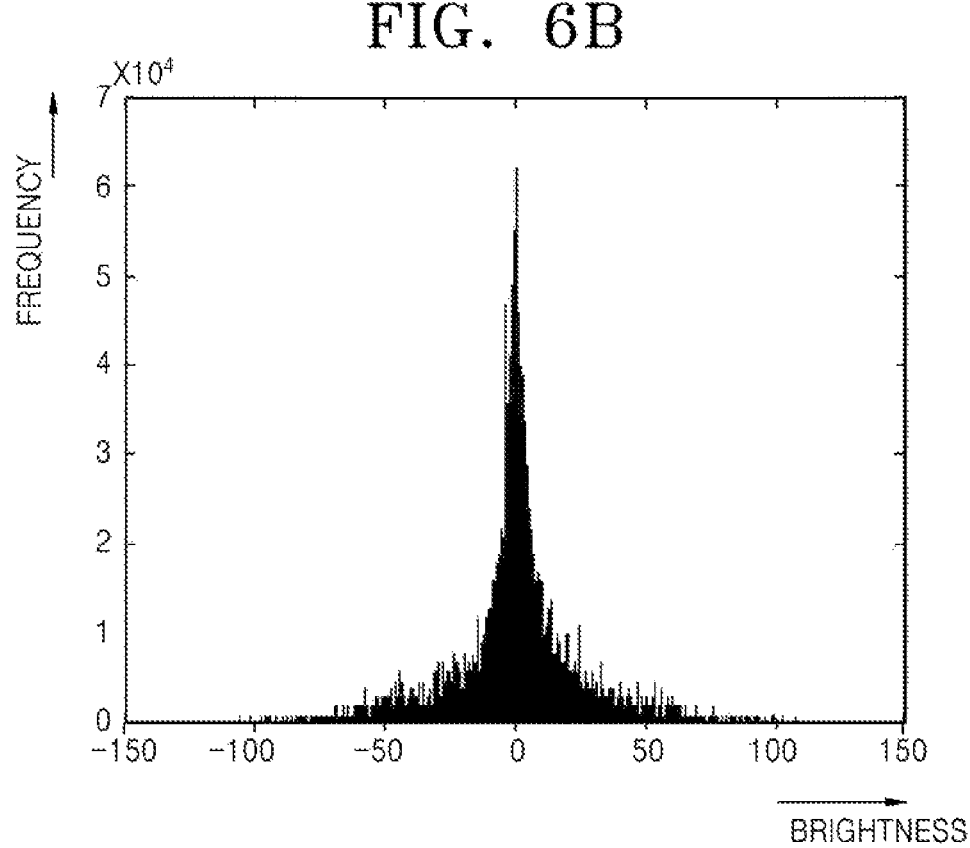

FIGS. 6A and 6B show that a brightness distribution of the background image follows a zero-mean Gaussian distribution.

According to the present exemplary embodiment, Gaussian distribution modeling images are generated using brightness components of an input image and a background image, and Gaussian distribution modeling results correspond to a zero-mean Gaussian distribution. However, when the Gaussian distribution modeling results follow a zero-mean Gaussian distribution, another component, e.g., an edge component, may be used instead of the brightness component.

Figure 7:
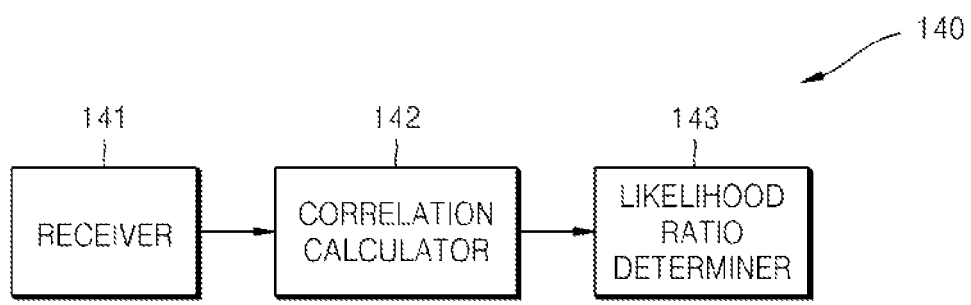
FIG. 7 is a block diagram of a likelihood ratio calculator in the target extracting apparatus of FIG. 1.

The likelihood ratio calculator 140 calculates and determines likelihood ratios for determining whether each pixel in the input image is a pixel corresponding to a target based on the Gaussian distribution modeling results. Referring to FIG. 7, the likelihood ratio calculator 140 includes a receiver 141, a correlation calculator 142, and a likelihood ratio determiner 143.

It may be considered that a dispersion value of an image varies slowly while a mean value of the image varies quickly. Thus, a distribution of image brightness values acquired by subtracting a brightness value of a pixel from a mean brightness value obtained around the pixel for every pixel is very similar to a Gaussian distribution of which a mean value is 0. Accordingly, a probability f0 that a pixel p having a specific location belongs to a target and a probability f1 that the pixel p having the specific location does not belong to the target may be obtained by Equation 2.

$$f_{p,0}(X, Y) = \qquad (2)$$

$$\frac{1}{(2\pi)^{D/2}|M|^{1/2}} \exp\left\{-\frac{1}{2}\left[((X-m_X)^T, (Y-m_Y)^T)M^{-1}\begin{pmatrix} X-m_X \\ Y-m_Y \end{pmatrix}\right]\right\}$$

$$f_{p,1}(X, Y) = \frac{1}{(2\pi)^{D/2}|M|^{1/2}} \exp$$

$$\left\{-\frac{1}{2}\left[((X-m_X)^T, (Y-m_Y-S)^T)M^{-1}\begin{pmatrix} X-m_X \\ Y-m_Y-S \end{pmatrix}\right]\right\}$$

In Equation 2, Y denotes an m×n input image acquired about a location of a pixel of interest, X denotes a background image of the input image, and $m_x$ and $m_y$ denote mean vectors of X and Y, respectively. In addition, S denotes an m×n template according to the target, D denotes the number of pixels in the target template, E denotes the expected value, and M may be obtained by Equation 3.

$$M = \begin{pmatrix} E\{(X-m_X)(X-m_X)^T\} & E\{(X-m_X)(X-m_Y)^T\} \\ E\{(Y-m_Y)(X-m_X)^T\} & E\{(X-m_Y)(X-m_Y)^T\} \end{pmatrix} \qquad (3)$$

When the probability $f_0$ that the pixel p belongs to the target and the probability $f_1$ that the pixel p does not belong to the target are obtained, a target determination equation, i.e., a likelihood ratio calculation equation, for determining that the current pixel p corresponds to the target if a ratio of the probability $f_1$ to the probability $f_0$ is greater than a threshold K', is obtained by Equation 4.

$$R(p) = \frac{f_1(X, Y)}{f_0(X, Y)} \begin{cases} \geq K', & H_1: \text{current pixel belongs to target} \\ < K', & H_0: \text{current pixel belongs to background} \end{cases} \qquad (4)$$

The likelihood ratio calculation equation is simplified into Equation 5.

$$\Lambda_0(p) = \max_k (S^k)^T [Y'_k - \rho_k \cdot X'_k] / |S^k|, \text{ where } k \in \{1, \ldots, L\} \qquad (5)$$

In Equation 5, $S^k$ denotes a kth target template from among a plurality of target templates having different sizes, $Y'_k = Y_k - \overline{Y}$, $X'_k = X_k - \overline{X}$, $Y_k - \overline{Y}$ denotes a first sub-image having a kth target template size based on a Gaussian distribution modeling result of the input image, $x_k - \overline{x}$ denotes a second sub-image having the kth target template size based on a Gaussian distribution modeling result of the background image, and $\rho_k$ denotes a correlation calculated from the first sub-image and the second sub-image.

The receiver 141 receives the Gaussian distribution modeling results of the input image and the background image from the Gaussian distribution modeling unit 130 and receives first to Lth target templates $S^1, \ldots, S^L$ having different sizes.

Figure 8A:
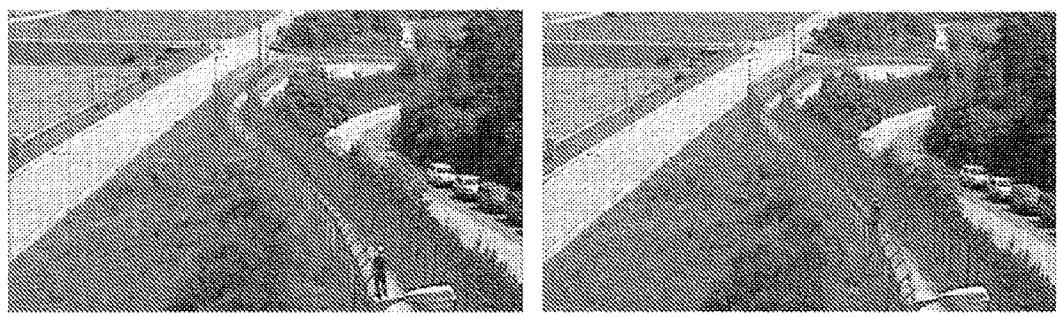
FIGS. 8A and 8B illustrate input images in which there is a target having various sizes and a plurality of target templates having different sizes, respectively.
Figure 8B:
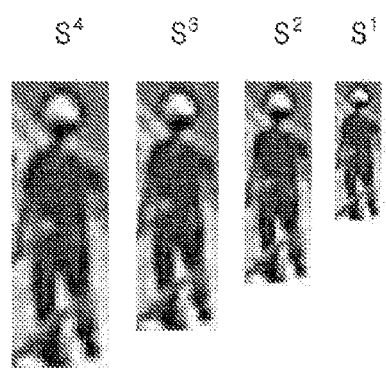

FIG. 8A shows input images in which there is a target (e.g., a person) having various sizes, and FIG. 8B shows first to fourth target templates $S^1, \ldots, S^4$ having different sizes. The first to fourth target templates $S^1, \ldots, S^4$ may have set sizes which are different according to a set target. For example, if the target is a person, the person has a vertical length that is longer than a horizontal length, which may be reflected when a target template is set. In the current embodiment, the number of L is 4, however the present invention is not limited thereto, that is, the number of L may be greater than or less than 4.

In the present exemplary embodiment, the first to Lth target templates $S^1, \ldots, S^L$ having different sizes may be analyzed in two ways. When the first to Lth target templates $S^1, \ldots, S^L$ having different sizes are set in advance, the first to Lth target templates $S^1, \ldots, S^L$ may use brightness distribution values corresponding to the respective set templates. However, when the first to Lth target templates $S^1, \ldots, S^L$ having different sizes are not set in advance, the first to Lth target templates $S^1, \ldots, S^L$ may each use a brightness distribution value having a first value, e.g., 1.

In addition, the first to Lth target templates $S^1, \ldots, S^L$ having different sizes may be used to calculate a correlation $\rho_k$ between sub-images. In this case, the first to Lth target templates $S^1, \ldots, S^L$ having different sizes indicate, for example, template sizes, such as 3×2 and 5×3, instead of the brightness distribution values.

The correlation calculator 142 calculates a correlation $\rho_k$ indicating a similarity between the input image and the background image.

To obtain the correlation $\rho_k$, first sub-images $Y'_1, \ldots, Y'_L$ having sizes of the first to Lth target templates $S^1, \ldots, S^L$ are extracted from each corresponding pixel in the Gaussian distribution modeling result of the input image, and second sub-images $X'_1, \ldots, X'_L$ having the sizes of the first to Lth target templates $S^1, \ldots, S^L$ are extracted from each corresponding pixel in the Gaussian distribution modeling result of the background image.

When the first sub-images $Y'_1, \ldots, Y'_L$ and the second sub-images) $X'_1, \ldots, X'_L$ are extracted, the correlation $\rho_k$ is calculated using Equation 6.

$$\rho_k = \frac{\sum_{i,j} Y'_k(i,j) - X'_k(i,j)}{\sum_{i,j} \{X'_k(i,j)\}^2} \quad (6)$$

In Equation 6, the calculated correlation $\rho_k$ between the first sub-images $Y'_1, \ldots, Y'_L$ and the second sub-images $X'_1, \ldots, X'_L$ has a value from about 0 to about 1, and as the correlation $\rho_k$ approaches 1, this increase in the correlation $\rho_k$ indicates that the input image is increasing in similarity to the background image.

Figure 9A:
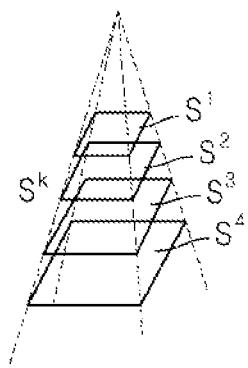
FIGS. 9A to 9C show an example in which a plurality of target templates having different sizes are applied to an input image and a background image.
Figure 9B:
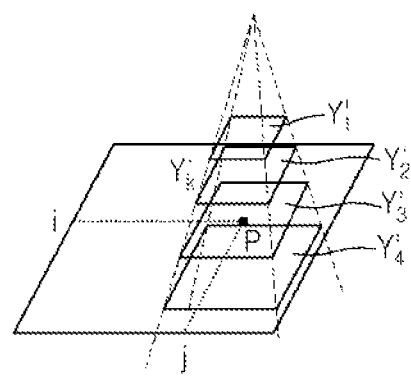
Figure 9C:
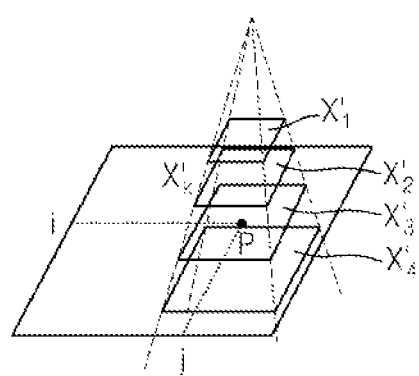

FIG. 9A shows first to fourth target templates $S^1, \ldots, S^4$. FIG. 9B shows first sub-images $Y'_1, \ldots, Y'_4$ having sizes of the first to fourth target templates $S^1, \ldots, S^4$, which are extracted about a pixel p at a specific location (i, j) in the Gaussian distribution modeling result of the input image. FIG. 9C shows second sub-images $X'_1, \ldots, X'_4$ having the sizes of the first to fourth target templates $S^1, \ldots, S^4$, which are extracted about the pixel p at the specific location (i, j) in the Gaussian distribution modeling result of the background image.

The likelihood ratio determiner 143 calculates a likelihood ratio using Equation 5. According to an exemplary embodiment, the likelihood ratio determiner 143 calculates likelihood ratios for each pixel in the whole input image based on a plurality of target templates having different sizes, the Gaussian distribution modeling results of the input image and the background image, and correlations of first sub-images and second sub-images and determines the maximum likelihood ratio as a likelihood ratio of a corresponding pixel. According to an exemplary embodiment, the number of calculated likelihood ratios may correspond to the number of target templates.

The target location determiner 150 determines a location of the target based on the likelihood ratios output from the likelihood ratio calculator 140 and outputs the determined location information of the target. The target location determination of the target location determiner 150 varies according to the number of targets.

When there is a single target in an image, the target location determiner 150 determines a location of a pixel having the maximum likelihood ratio from among the likelihood ratios calculated by the likelihood ratio calculator 140 as a location of the target.

However, when there is a plurality of targets in an image, the target location determiner 150 receives the likelihood ratios calculated by the likelihood ratio calculator 140 and a threshold K for target determination and generates a target map having the same size as the input image. When each of the likelihood ratios is greater than the threshold K, the target location determiner 150 sets a first value, e.g., 1, on the target map. Otherwise, when each of the likelihood ratios is not greater than the threshold K, the target location determiner 150 sets a second value, e.g., 0, on the target map.

FIG. 10A shows an input image, and FIG. 10B shows an example in which the first value is labeled on a target map having the same size as the input image when a likelihood ratio is greater than the threshold K and the second value is labeled on the target map when a likelihood ratio is not greater than the threshold K. FIG. 10C is a monochrome image of FIG. 10B.

The target location determiner 150 determines each area set to the first value as a single target, sets a representative location of each of the targets, and determines the set locations as locations of the targets.

Figure 11:
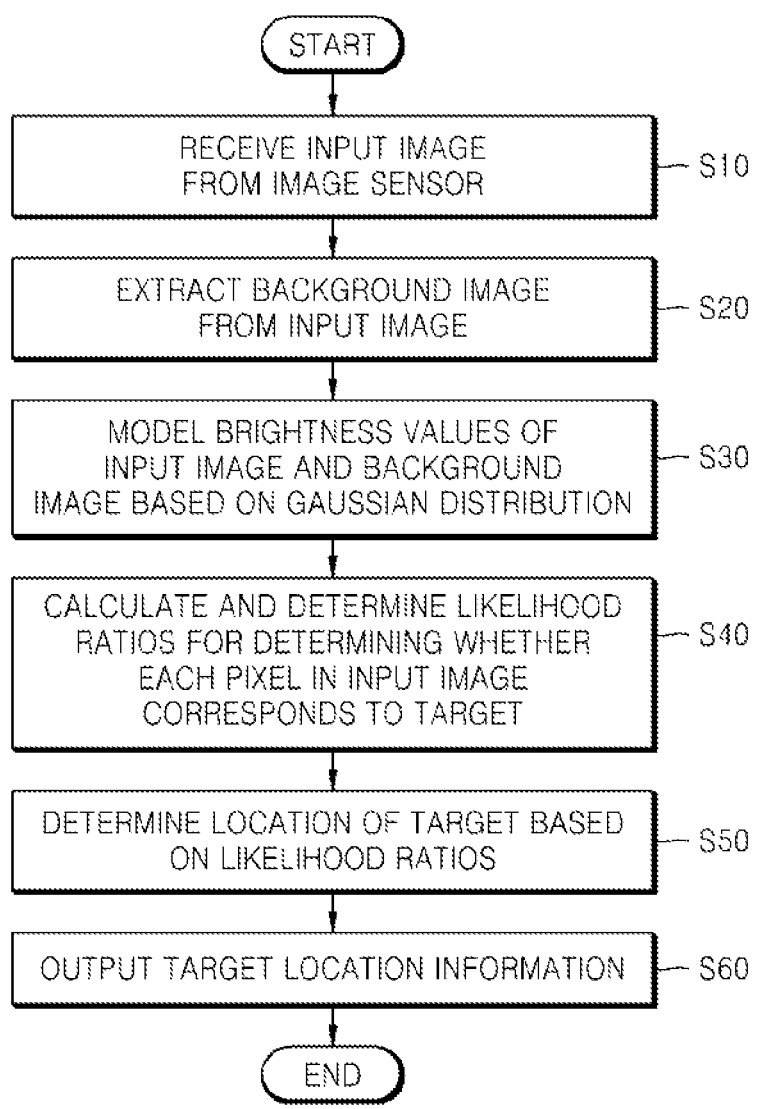
FIG. 11 is a flowchart illustrating a target extracting method according to an exemplary embodiment.

FIG. 11 is a flowchart illustrating a target extracting method according to an exemplary embodiment. Hereinafter, the description with reference to FIGS. 1 to 10C is not repeated. Furthermore, although the target extracting method is exemplarily described below with reference to certain components described with reference to FIGS. 1 to 10C, the target extracting method is not limited thereto and may also be implemented using other components.

Referring to FIG. 11, in operation S10, the target extracting apparatus 100 receives an input image using the image sensor 110.

In operation S20, the target extracting apparatus 100 extracts a background image from the input image. Since a method of extracting the background image from the input image is described above, a description thereof is omitted.

Figure 12:
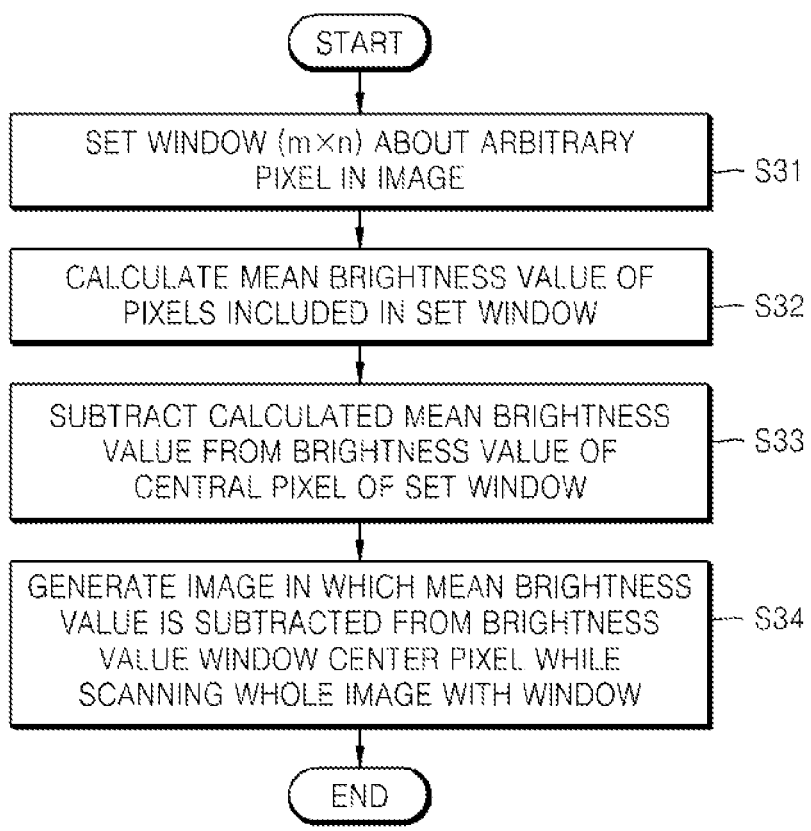
FIG. 12 is a flowchart illustrating a Gaussian distribution modeling method of an input image and a background image in the method of FIG. 11.

In operation S30, the target extracting apparatus 100 models brightness values of the input image and the background image based on a Gaussian distribution. FIG. 12 is a flowchart illustrating a Gaussian distribution modeling method of the input image and the background image.

Referring to FIG. 12, in operation S31, the target extracting apparatus 100 sets a window having a predetermined size about an arbitrary pixel for each of the input image and the background image. In operation S32, the target extracting apparatus 100 calculates a mean brightness value of pixels included in the window set for each of the input image and the background image. In operation S33, the target extracting apparatus 100 subtracts the calculated mean brightness value from a brightness value of the window center pixel set in each of the input image and the background image. In operation S34, the target extracting apparatus 100 generates a Gaussian distribution modeling image as Gaussian distribution modeling results obtained by subtracting every mean brightness value from a brightness value of each corresponding window center pixel while scanning the input image and the background image with a window about each pixel.

Figure 13:
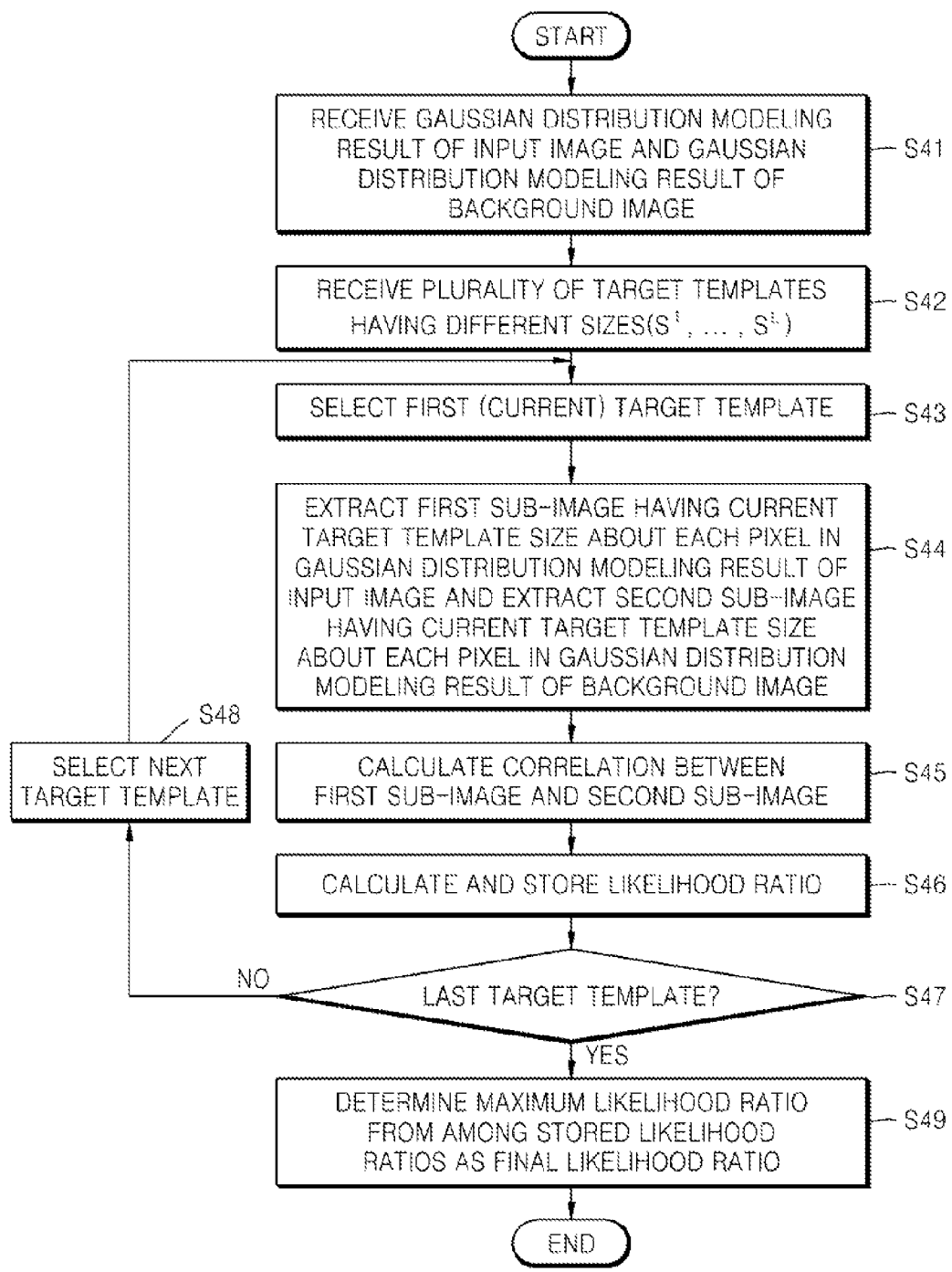
FIG. 13 is a flowchart illustrating a method of calculating and determining likelihood ratios in the method of FIG. 11.

Referring back to FIG. 11, after completing the generating of the Gaussian distribution modeling image as the Gaussian distribution modeling results, the target extracting apparatus 100 calculates and determines likelihood ratios for determining whether each pixel in the input image is a pixel corresponding to a target based on the Gaussian distribution modeling results. FIG. 13 is a flowchart illustrating a method of calculating and determining likelihood ratios.

Referring to FIG. 13, in operation S41, the target extracting apparatus 100 receives the Gaussian distribution modeling result of the input image and the Gaussian distribution modeling result of the background image. In operation S42, the target extracting apparatus 100 receives a plurality of target templates having different sizes. In operation S43, the target extracting apparatus 100 selects a first (current) target template from among the received target templates. In operation S44, the target extracting apparatus 100 extracts a first sub-image having a current target template size about each pixel in the Gaussian distribution modeling result of the input image and extracts a second sub-image having the current target template size about each pixel in the Gaussian distribution modeling result of the background image. In operation S45, the target extracting apparatus 100 calculates a correlation between the first sub-image and the second sub-image using Equation 6. In operation S46, the target extracting apparatus 100 calculates a likelihood ratio by substituting the current target template, the correlation, the first sub-image, and the second sub-image into Equation 5 and stores the calculated likelihood ratio. After calculating and storing the likelihood ratio of the current target template, the target extracting apparatus 100 determines in operation S47 whether the selected target template is the last target template. If the selected target template is not the last target template, the target extracting apparatus 100 selects a next target template in operation S48 and repeatedly performs operations S44 to S46. Otherwise, if the selected target template is the last target template, the target extracting apparatus 100 determines the maximum likelihood ratio from among the stored likelihood ratios as a final likelihood ratio in operation S49.

Figure 14:
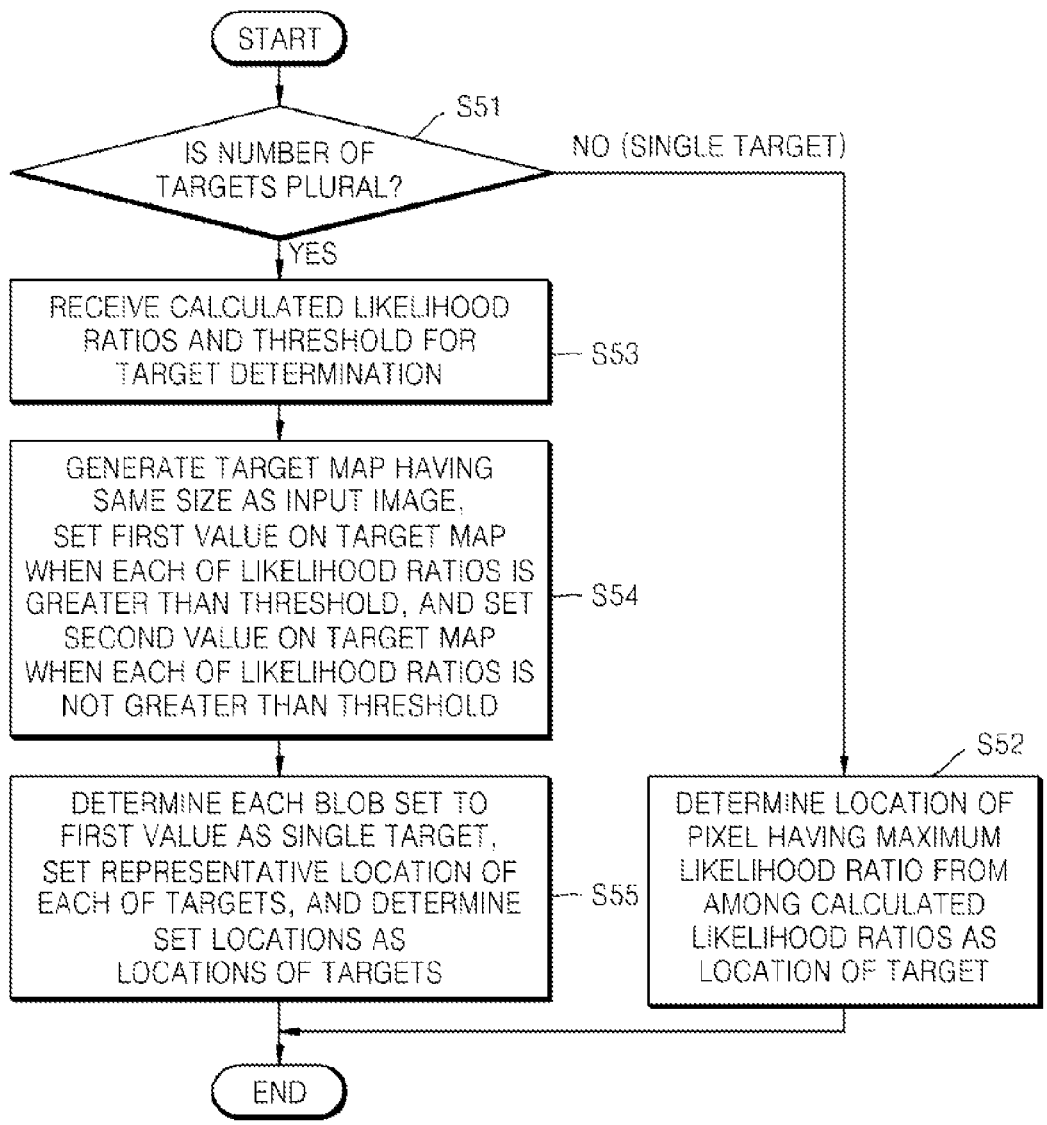
FIG. 14 is a flowchart illustrating a method of determining a location of a target in the method of FIG. 11.

Referring back to FIG. 11, after calculating and determining the likelihood ratio, the target extracting apparatus 100 determines a location of the target based on the likelihood ratio in operation S50. FIG. 14 is a flowchart illustrating a method of determining a location of the target.

Referring to FIG. 14, in operation S51, the target extracting apparatus 100 determines whether the number of targets is singular or plural. In the case of a single target, the target extracting apparatus 100 determines a location of the maximum likelihood ratio from among the calculated likelihood ratios as a location of the target in operation S52. Otherwise, in the case of a plurality of targets, the target extracting apparatus 100 receives the calculated likelihood ratios and a threshold K for target determination in operation S53. In operation S54, the target extracting apparatus 100 generates a target map having the same size as the input image, sets a first value, e.g., 1, on the target map when each of the likelihood ratios is greater than the threshold K, and sets a second value, e.g., 0, on the target map when each of the likelihood ratios is not greater than the threshold K. After completely setting the first value and the second value on the target map, the target extracting apparatus 100 determines each area set to the first value as a single target, sets a representative location of each of the targets, and determines the set locations as locations of the targets in operation S55.

Referring back to FIG. 11, after completing the location determination of the target, the target extracting apparatus 100 outputs the determined location information of the target in operation S60.

As is apparent from the foregoing description, a target may be correctly extracted from an input image using a plurality of target templates having different sizes, background image modeling, and a correlation between the input image and its background image, regardless of a change in target size.

The exemplary embodiments can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, functional programs, codes, and code segments for accomplishing the exemplary embodiments can be easily construed by programmers skilled in the art to which the exemplary embodiments pertain.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims. The exemplary embodiments should be considered in a descriptive sense only and not for purposes of limitation. Therefore, the scope of the present disclosure is defined not by the detailed description of the present disclosure but by the appended claims, and all differences within the scope will be construed as being included in the present disclosure.

All cited references including publicized documents, patent applications, and patents cited in the present disclosure can be merged in the present disclosure in the same manner as shown by individually and concretely merging each cited reference and shown by generally merging each cited reference in the present disclosure.

What is claimed is:

1. A method of extracting a target, the method comprising:
    extracting a background image from an input image;
    modeling brightness values of the input image and the background image based on a Gaussian distribution to generate an input image modeling result and a background image modeling result;
    calculating likelihood ratios for determining whether a pixel in the input image corresponds to a target based on a correlation between the input image modeling result and the background image modeling result and target templates having different sizes;
    determining a location of the target based on the calculated likelihood ratios; and
    outputting the determined location of the target,
    wherein, for a plurality of targets, the determining of the locations of the targets comprises:

receiving the likelihood ratios and a threshold for target determination;

generating a target map having a same size as the input image, setting areas on the target map to have a first value when each of the likelihood ratios for the areas is greater than the threshold, and setting areas on the target map to have a second value when each of the likelihood ratios for the areas is not greater than the threshold; and determining each area set to the first value as a single target, setting a representative location for each of the plurality of targets, and determining the representative locations as locations of the plurality of targets.

2. The method of claim 1, wherein the modeling of the brightness values comprises:

setting a window having a predetermined size about a pixel in each of the input image and the background image;

calculating a mean brightness value of pixels included in the set window;

subtracting the mean brightness value from a brightness value of a center pixel in the set window; and generating an image in which the mean brightness value is subtracted from the brightness value of the center pixel in the set window while scanning the input image and the background image with the set window.

3. The method of claim 1, wherein the calculating of the likelihood ratios comprises:

receiving Gaussian distribution modeling results of the input image and the background image;

receiving the target templates having different sizes;

calculating a correlation between the input image modeling result and the background image modeling result; and acquiring likelihood ratios for each of a plurality of pixels in the input image, a number of the acquired likelihood ratios corresponding to a number of the target templates, and determining a maximum likelihood ratio from among the acquired likelihood ratios as a likelihood ratio of the pixel corresponding to the target.

4. The method of claim 3, wherein in the receiving of the target templates having different sizes, if the target templates having different sizes are set in advance, the target templates use brightness distribution values of the set target templates.

5. The method of claim 3, wherein in the receiving of the target templates having different sizes, if the target templates having different sizes are not set in advance, the target templates are set to have a third value.

6. The method of claim 3, wherein the calculating of the correlation comprises:

extracting a first sub-image having a corresponding target template size from the Gaussian distribution modeling result of the input image;

extracting a second sub-image having the corresponding target template size from the Gaussian distribution modeling result of the background image; and calculating a correlation indicating a similarity between the input image and the background image by using the first sub-image and the second sub-image.

7. The method of claim 6, wherein the correlation is calculated by using the equation:

$$\rho_k = \frac{\sum_{i,j} Y'_k(i,j) - X'_k(i,j)}{\sum_{i,j} \{X'_k(i,j)\}^2},$$

where $Y'_k = Y_k - \overline{Y}$, $X'_k = X_k - \overline{X}$, $Y_k - \overline{Y}$ denotes a first sub-image having a kth target template size, which is extracted from the Gaussian distribution modeling result of the input image, where i and j are location coordinates of a pixel in the Gaussian distribution modeling result of the input image, $Y_k$ is an input image and $\overline{Y}$ is an average of the input images, and $X_k - \overline{X}$ denotes a second sub-image having the kth target template size, which is extracted from the Gaussian distribution modeling result of the background image, where $X_k$ is a background image and $\overline{X}$ is an average of the background images.

8. The method of claim 3, wherein each of the likelihood ratios is calculated by using the equation:

$$\Lambda_0(p) = \max_k (S^k)^T [Y'_k - \rho_k \cdot X'_k] / |S^k|, \text{ where } k \in \{1, \ldots, L\},$$

where $S^k$ denotes a kth target template from among the target templates having different sizes, $Y'_k = Y_k - \overline{Y}$, $X'_k = X_k - \overline{X}$, $Y_k - \overline{Y}$ denotes a first sub-image having a kth target template size based on the Gaussian distribution modeling result of the input image, p denotes a location of a pixel, T denotes a real number, L denotes a number of the target templates, $Y_k$ is an input image and $\overline{Y}$ is an average of the input images, $X_k - \overline{X}$ denotes a second sub-image having the kth target template size based on the Gaussian distribution modeling result of the background image, where $X_k$ is a background image and $\overline{X}$ is an average of the background images, and $\rho_k$ denotes a correlation calculated from the first sub-image and the second sub-image.

9. The method of claim 1, wherein, for a single target, the determining of the location of the target comprises determining a location of a pixel having a maximum likelihood ratio from among the calculated likelihood ratios as the location of the target.

10. An apparatus which extracts a target, the apparatus comprising:

a background image extractor which extracts a background image from an input image;

a Gaussian distribution modeler which models brightness values of the input image and the background image based on a Gaussian distribution to generate an input image modeling result and a background image modeling result;

a likelihood ratio calculator which calculates likelihood ratios used to determine whether a pixel in the input image corresponds to a target based on a correlation between the input image modeling result and the background image modeling result and target templates having different sizes; and a target location determiner which determines a location of the target based on the calculated likelihood ratios and outputs the determined location of the target, wherein, for a plurality of targets, the target location determiner receives the likelihood ratios and a threshold for target determination, generates a target map having a same size as the input image, sets areas on the target map to have a first value when each of the likelihood ratios for the areas are is greater than the threshold, sets areas on the target map to have a second value when each of the likelihood ratios for the areas is not greater than the threshold, determines each area set to the first value as a single target, sets a representative location for each of the plurality of targets, and determines the representative locations as locations of the plurality of targets.

11. The apparatus of claim 10, wherein the Gaussian distribution modeler comprises:
a window setter which sets a window having a predetermined size about a pixel in each of the input image and the background image;
a first calculator which calculates a mean brightness value of pixels included in the set window;
a second calculator which subtracts the mean brightness value from a brightness value of a center pixel in the set window; and
a Gaussian distribution image generator which generates an image in which the mean brightness value is subtracted from the brightness value of the center pixel in the set window while scanning the input image and the background image with the set window.

12. The apparatus of claim 10, wherein the likelihood ratio calculator comprises:
a receiver which receives Gaussian distribution modeling results of the input image and the background image and receives the target templates having different sizes;
a correlation calculator which calculates a correlation between the input image modeling result and the background image modeling result; and
a likelihood ratio determiner which acquires likelihood ratios for each of a plurality of pixels in the input image, a number of the acquired likelihood ratios corresponding to a number of the target templates, and determines a maximum likelihood ratio from among the acquired likelihood ratios as a likelihood ratio of the pixel corresponding to the target.

13. The apparatus of claim 12, wherein in the receiver, if the target templates having different sizes are set in advance, the target templates use brightness distribution values of the set target templates.

14. The apparatus of claim 12, wherein in the receiver, if the target templates having different sizes are not set in advance, the target templates are set to have a third value.

15. The apparatus of claim 12, wherein the correlation calculator calculates the correlation by using the equation:

$$\rho_k = \frac{\sum_{i,j} Y'_k(i,j) - X'_k(i,j)}{\sum_{i,j} \{X'_k(i,j)\}^2},$$

where $Y'_k = Y_k - \overline{Y}$, $X'_k = X_k - \overline{X}$, $Y_k - \overline{Y}$ denotes a first sub-image having a kth target template size, which is extracted from the Gaussian distribution modeling result of the input image,
where i and j are location coordinates of a pixel in the Gaussian distribution modeling result of the input image, $Y_k$ is an input image and $\overline{Y}$ is an average of the input images,
and $X_k - \overline{X}$ denotes a second sub-image having the kth target template size, which is extracted from the Gaussian distribution modeling result of the background image,
where $X_k$ is a background image and $\overline{X}$ is an average of the background images.

16. The apparatus of claim 12, wherein the likelihood ratio determiner calculates the likelihood ratios by using the equation:

$$\Lambda_0(p) = \max_k (S^k)^T [Y'_k - \rho_k \cdot X'_k] / |S^k|, \text{ where } k \in \{1, \ldots, L\},$$

where $S^k$ denotes a kth target template from among the target templates having different sizes, $Y'_k = Y_k - \overline{Y}$, $X'_k = X_k - \overline{X}$, $Y_k - \overline{Y}$ denotes a first sub-image having a kth target template size based on the Gaussian distribution modeling result of the input image,
p denotes a location of a pixel, T denotes a real number, L denotes a number of the target templates,
$Y_k$ is an input image and $\overline{Y}$ is an average of the input images,
$X_k - \overline{X}$ denotes a second sub-image having the kth target template size based on the Gaussian distribution modeling result of the background image,
where $X_k$ is a background image and $\overline{X}$ is an average of the background images,
and $\rho_k$ denotes a correlation calculated from the first sub-image and the second sub-image.

17. The apparatus of claim 10, wherein, for a single target, the target location determiner determines a location of a pixel having a maximum likelihood ratio from among the calculated likelihood ratios as a location of the target.

18. A non-transitory computer-readable recording medium storing a computer-readable program for executing a method of extracting a target, the method including:
extracting a background image from an input image;
modeling brightness values of the input image and the background image based on a Gaussian distribution to generate an input image modeling result and a background image modeling result;
calculating likelihood ratios for determining whether a pixel in the input image corresponds to a target based on a correlation between the input image modeling result and the background image modeling result and target templates having different sizes;
determining a location of the target based on the calculated likelihood ratios; and
outputting the determined location of the target,
wherein, for a plurality of targets, the determining of the locations of the targets comprises:
receiving the likelihood ratios and a threshold for target determination;
generating a target map having a same size as the input image, setting areas on the target map to have a first value when each of the likelihood ratios for the areas is greater than the threshold, and setting areas on the target map to have a second value when each of the likelihood ratios for the areas is not greater than the threshold; and
determining each area set to the first value as a single target, setting a representative location for each of the plurality of targets, and determining the representative locations as locations of the plurality of targets.

* * * * *